(12) United States Patent
Penno et al.

(10) Patent No.: US 10,794,506 B2
(45) Date of Patent: Oct. 6, 2020

(54) RUPTURE DISC ASSEMBLY WITH A RUPTURE DISC AND AN ACTUATOR FOR REDUCING THE RUPTURE PRESSURE

(71) Applicant: Rembe GmbH Safety + Control, Brilon (DE)

(72) Inventors: Bernhard Penno, Brilon (DE); Stefan Penno, Brilon (DE)

(73) Assignee: Rembe GmbH Safety + Control, Brilon (DE)

( * ) Notice: Subject to any disclaimer, the term of this patent is extended or adjusted under 35 U.S.C. 154(b) by 0 days.

(21) Appl. No.: 16/050,587

(22) Filed: Jul. 31, 2018

(65) Prior Publication Data
US 2020/0041015 A1 Feb. 6, 2020

(51) Int. Cl.
*F16K 17/16* (2006.01)
*F17C 13/04* (2006.01)

(52) U.S. Cl.
CPC .......... *F16K 17/1613* (2013.01); *F17C 13/04* (2013.01); *F17C 2205/0314* (2013.01); *Y10T 137/1737* (2015.04); *Y10T 137/1767* (2015.04)

(58) Field of Classification Search
CPC .............. F17C 13/04; F17C 2205/0314; F16K 17/1613; F16K 17/1626; F16K 17/1606; F16K 17/162; F16K 17/16; F16K 17/14; Y10T 137/1737; Y10T 137/1767
USPC .................... 137/70, 797, 68.26, 68.29, 68.3
See application file for complete search history.

(56) References Cited

U.S. PATENT DOCUMENTS 3,915,235 A * 10/1975 Hamilton .............. F16K 17/403
169/28
4,084,602 A * 4/1978 Cook ..................... A62C 13/76
137/68.13
4,126,184 A 11/1978 Hinrichs
5,076,312 A * 12/1991 Powell .................. B60R 21/268
137/68.25
5,131,680 A * 7/1992 Coultas ................. B60R 21/272
222/3

(Continued)

FOREIGN PATENT DOCUMENTS

DE 102007022018 A1 11/2007
EP 3112732 A1 1/2017

OTHER PUBLICATIONS

Chemring Energetics UK: "Metron Actuator", Ayrshire (UK), pp. 1-35, XP055561501, Internet: URL:http://www.chemringenergetics.co.uk/~/mediaiFiles/C/C/Chemring-Energetics-V2/Metron%20A5%20Brochure.pdf (Jul. 14, 2016).

(Continued)

*Primary Examiner* — Kevin F Murphy
*Assistant Examiner* — Jonathan J Waddy
(74) *Attorney, Agent, or Firm* — Edell, Shapiro & Finnan, LLC

(57) ABSTRACT

A rupture disk assembly comprises: a single-part or multi-part body with an opening that forms an outlet for a conduit or a container; a rupture disk that closes the opening and bursts subject to the action of a rupture pressure in order to unblock the opening; an actuator to reduce the rupture pressure, wherein the actuator includes a plunger to reduce the rupture pressure on the rupture disk, the plunger being configured to strike against the rupture disk; and a housing to receive the actuator, the housing including a housing opening for the plunger.

19 Claims, 4 Drawing Sheets

(56) References Cited

U.S. PATENT DOCUMENTS

| | | | |
|---|---|---|---|
| 5,762,364 A * | 6/1998 | Cuevas | B60R 21/203 |
| | | | 280/731 |
| 6,006,842 A | 12/1999 | Stilwell et al. | |
| 2008/0289694 A1* | 11/2008 | Edwards | F16K 17/403 |
| | | | 137/70 |
| 2009/0314355 A1* | 12/2009 | Szeglin | F16K 13/06 |
| | | | 137/68.13 |
| 2010/0127195 A1 | 5/2010 | Mclelland et al. | |
| 2017/0002943 A1* | 1/2017 | Bunse | F16K 17/1606 |

OTHER PUBLICATIONS

Office Action in corresponding European Patent Application No. 17153103.1, dated Mar. 3, 2019, with English translation.

\* cited by examiner

RUPTURE DISC ASSEMBLY WITH A RUPTURE DISC AND AN ACTUATOR FOR REDUCING THE RUPTURE PRESSURE

TECHNICAL FIELD

The present invention relates to a rupture disk assembly comprising a single-part or multi-part body, which has an opening, which forms an outlet for a conduit or a container; comprising a rupture disk, which closes the opening and which bursts subject to the action of a rupture pressure, in order to unblock the opening; and comprising an actuator for reducing the rupture pressure, wherein the actuator has a rod, in particular, a plunger, which acts on the rupture disk, in particular, can strike against the rupture disk, in order to reduce the rupture pressure.

BACKGROUND

European patent application 15/174,944.7 describes a rupture disk assembly of the general type described.

Rupture disk assemblies are often encountered in industrial plants to protect conduits or containers of any kind against unallowable pressures and explosions. Rupture disks provide predetermined breaking points, at which the conduits or containers or other structures open, in the conduits or containers or other structures, in the event that the pressure in the conduits or containers or other structures increases such that an uncontrolled rupture of the conduits or containers or other structures can be expected. Then the rupture disks, which open at a nominal rupture pressure, enable controlled venting or a controlled pressure relief in the conduits or containers or the other structures.

Rupture disk assemblies generally have a body that can be designed in many different ways. The body can be produced monolithically or from multiple parts. The body may be part of the conduit or the container to be secured. The body has an opening, which forms an outlet of the conduit or the container to be secured and through which the pressure relief can take place in the event that the nominal rupture pressure is reached and the medium, stored in the conduit or the container, can escape. In the normal operating mode this opening is closed by a rupture disk, which is mounted on the body for this purpose.

The nominal rupture pressure (also set pressure) of a rupture disk depends on many features of the rupture disk. The external structure that can be mentioned in this case includes, for example, the geometric features of the rupture disk (the thickness, the length and the width or the diameter of the rupture disk, the curvatures, the indentations in the rupture disk produced by material removal, etc. or the material that is used). Important factors are, in addition to the selected material, also the internal structure of the material, for example, the microstructure of the material that may be altered, for example, by local deformations, as described, for example, in the document DE 10 2007 022 018 A1. The nominal rupture pressure can also be adjusted by buckling bars.

Rupture disks have proven to be effective millions of times in the past and have protected plants, animals and humans from major damage and disasters. Nevertheless, damage can occur also in the cases where a rupture disk opens.

In some of these cases, it may be desirable if the rupture disk could open at a pressure that is lower than the nominal rupture pressure, for example, half the nominal rupture pressure. It is possible for the rupture disk to open at a lower pressure in a rupture disk assembly, known from the European patent application 15/174,944.7. Although it is possible to reach pressure levels that, to stay with the example, are higher than half the nominal rupture pressure even during a trouble-free operation of the conduit or the container, this situation does not result in an opening of the rupture disk in the rupture disk assembly according to the application 15/174,944.7, since the rupture pressure of the rupture disk is not lowered in the trouble-free operation. If, in contrast, the rupture pressure is reduced by an actuator, then the rupture disk can burst, even at a pressure that corresponds to half the nominal rupture pressure.

Then the rupture pressure of the rupture disk may be selectively reduced by the actuator such that the rupture disk also opens at a pressure that is less than the nominal rupture pressure. Thus, the conduit, secured by the rupture disk assembly, or the container, secured by the rupture disk assembly, or the secured structure, may also be relieved at a pressure that is lower than the nominal rupture pressure. At the same time, however, the rupture disk can be operated, at least until the rupture pressure is reduced, at pressure levels that are higher than the pressure, to which the rupture pressure can be lowered by the effect of the actuator.

The application 15/174,944.7 shows that the actuator can be disposed on the side of the rupture disk that faces the container to be secured or the conduit to be secured. As a result, the actuator is disposed in an environment, in which there is a medium that is stored in the container to be secured or is guided through the conduit to be secured. The medium, which may be, for example, a gas, a liquid or anything else, could have an effect on the actuator, for example, impair its function, soil it or even render it useless.

SUMMARY

An object of the present invention is to improve a rupture disk assembly of the type mentioned in the introductory part such that contact of the medium with the actuator is avoided, yet the actuator is disposed, nevertheless, on the side of the rupture disk that faces the container to be secure or the conduit to be secured.

This problem is solved by the feature that the rupture disk assembly comprises a housing, which receives the actuator and has a housing opening for the rod, in particular, the plunger.

By incorporating the actuator in the housing the actuator is protected against the medium in the container to be secured or the conduit to be secured. The medium cannot influence the function of the actuator.

The housing opening can be closed with a cover, wherein the cover and the actuator are adapted to one another such that upon actuation of the actuator, the force, acting on the plunger of the actuator, is sufficient to pierce the cover and to strike against the rupture disk. The cover makes it possible to provide the actuator with complete protection against the medium in a simple way. Due to the fact that the cover is destroyed when the actuator is actuated and, in so doing, the way for the plunger of the actuator is open, it is easily possible for the actuator to become active when it is necessary without having to provide a mechanism, by which the cover is opened and the housing opening is unblocked. The cover may be a further rupture disk.

The cover may be a circular blank. A circular blank can be made quickly and easily from various materials. The circular blank may be stamped from a plate or cast into simple shapes.

The cover may consist of plastic or metal, in particular, sheet metal, in particular, sheet steel.

The cover may be mounted on the housing by a screw cap or a perforated cap, wherein an opening of the screw cap or a hole in the cap is so large that the plunger of the actuator can pass through. The cover could also be mounted on the housing with a snap ring or with screws. Similarly it is possible that the cover is welded to the housing.

The cover is advantageously sealed with respect to the housing and/or the screw cap or the perforated cap by at least one seal or a sealing fluid or a sealing solid-liquid mixture. Although sufficient sealing of the cover with respect to the housing can be achieved even without a seal or without a sealing fluid or without a sealing solid-liquid mixture, a seal or a sealing fluid or a sealing solid-liquid mixture offers higher assurance of sufficient tightness in a simple way. The seal may be a sealing ring, in particular, an O-ring.

According to the invention, it is also possible to dimension the housing opening such that there is a clearance fit between the housing opening and the rod, in particular, the plunger. It may be a dH8/h9, dH7/g6 or a dH7/h6 fit. The gap between the housing and the rod may be sealed with a seal, a sealing fluid or a sealing solid-liquid mixture. In such a configuration of the invention only the end of the rod is exposed to the medium in the container to be secured or the conduit to be secured. Then it is sufficient, if the rod is designed such that it can be exposed to the medium without any adverse effect, an aspect that also applies, as a rule, to the cover. In this embodiment of the invention it is possible that one end of the rod is connected to the rupture disk.

The body of a rupture disk assembly of the present invention may comprise a recess, in particular, a threaded bore. Furthermore, it is possible that the housing is inserted into the recess, in particular, is screwed into the threaded bore by an outside thread.

The housing for the actuator of a rupture disk assembly of the present invention can project into an inner space of the body. In particular, an end, which is provided with the cover and is part of the housing, can project into the inner space of the body. In contrast, another end of the housing can project beyond the body. At this end the housing can have an opening, through which cables are run from or to the actuator.

The housing for the actuator of a rupture disk assembly of the present invention can comprise a section with an inside thread. The actuator may have a section with an outside thread. The actuator can be screwed into the inside thread of the housing with the outside thread, as a result of which the actuator can be fixed in the housing. Other ways of fixing the actuator in the housing are also possible.

The body of a rupture disk assembly of the present invention may have a flange, on which the rupture disk is mounted. The rupture disk may also be mounted on the body in any other way, in particular, any other known way. The body may comprise, in particular, a hollow cylindrical section, in which the recess is provided, into which the housing is inserted. The recess may be provided, in particular, in a wall of the hollow cylindrical section. The recess may be a threaded bore, followed by a connecting piece.

The body may comprise at least one further recess, into which at least one sensor is inserted that projects into the body and records by measurement the physical and/or chemical quantities in the body. The measured variables, recorded by the sensor(s), may be processed in a controller of the rupture disk assembly. The controller may have an input for connecting to the sensor. The actuator can be controlled by the controller as a function of the values of the recorded measurement variable(s). For this purpose the controller may comprise an output that is connected to the switching input of the drive. At least one of the recorded measured variables may be the pressure and/or the temperature. However, it is also possible that the concentration of a specific substance is determined. The controller is able to determine from the measured variables the deviation over time, i.e., the change in the measured variables.

The hollow cylindrical section of the body may be connected to the flange of the body on a first side and may be closed by the rupture disk, abutting the flange. A second side of the hollow cylindrical section of the body may comprise connecting structures for connecting to a container or a conduit.

The reduction in the rupture pressure of the rupture disk is preferably irreversible. Irreversible means in this context that the rupture pressure is lowered once and can, thereafter, not be increased again. If the rupture pressure of the rupture disk assembly is to be increased again, then the rupture disk assembly or at least the rupture disk must be replaced.

According to the invention, the rupture disk assembly may be designed such that energy can be supplied intermittently to the rupture disk by the actuator. In particular, by supplying energy intermittently it is possible to control the behavior of the rupture disk quickly and to control the nominal rupture pressure. The supplied energy may be kinetic energy. If the supplied energy is kinetic energy, then this kinetic energy may be transmitted to the rupture disk, for example, by tensile forces or compressive forces.

The rupture pressure is lowered by the actuator without destroying the rupture disk. As a result, the rupture disk remains, as a rule, intact, unless the pressure in the conduit or in the container is higher than the lowered rupture pressure. A destruction of the rupture disk, for example, due to a mechanical perforation of the rupture disk by the actuator, would result in a reduction of the rupture pressure to zero, which is not beneficial in view of the object underlying the present invention and is also not understood in the context of the application as a lowering of the rupture pressure.

The rupture disk may still be destroyed suddenly as a result of the lowering of the rupture pressure by the actuator, i.e., when the conduit, the container or the structure has a pressure above the rupture pressure, to which the actuator lowers the rupture pressure. Then the rupture disk responds immediately due to the lowering of the rupture pressure by the actuator.

In order to lower the rupture pressure, the actuator of a rupture disk assembly of the present invention can be used to change the internal structure of the material, from which the rupture disk is produced, and/or the geometry of the rupture disk, in particular, the shape of the rupture disk, at least at one location of the rupture disk. The location of the rupture disk, to which the change is applied, may have, for example, a diameter of 2.7 mm for a rupture disk with a diameter of 142 mm, a sheet metal thickness of 0.8 and a curvature with a depth of 23.5 mm.

The actuator of a rupture disk assembly of the present invention may comprise a rod and a drive, wherein the rod may be driven by the drive, in order to transmit energy to the rupture disk when the drive is energized due to the impact stroke of the rod or pull of the rod.

The rod may have a first face, which is arranged at a distance from the rupture disk in the OFF state of the drive and which is adjacent to the rupture disk in the ON state, in particular, during the execution of the impact stroke. It is also possible that the first face rests against the rupture disk in the OFF state of the drive, whereas in the ON state the first face of the rod is removed from the rupture disk, as a result of which the inner structure or the outer structure of the rupture disk changes.

The drive may be an electric drive. Pneumatic or hydraulic drives may also be used. The drive may include an electromagnet.

In the already aforementioned example of a rupture disk with a diameter of 142 mm, the force, applied by a drive, may reach up to 2300 N. Energy of 3.43 J may be introduced.

In a rupture disk assembly of the present invention, the actuator may be arranged such that a location of the rupture disk, against which the rod strikes when the drive is switched on or at which the rod pulls when the drive is switched on, is located between a center of the rupture disk and an edge of the rupture disk. The location may also correspond to the center. Tests have shown that in the case of a circular reversible rupture disk, the more the location, on which the rod acts, is located in the vicinity of the center, the more the rupture pressure can be reduced. In the test the lowering of the rupture pressure may be determined by choosing the location along a radius.

The rupture disk that is used in a rupture disk assembly of the present invention may be a reversible rupture disk. Basically any type of rupture disk of any shape may be used in a rupture disk assembly of the present invention, for example, tensile-stressed rupture disks, reversible rupture disks, buckling rod reversible rupture disks, flat rupture disks, etc.

BRIEF DESCRIPTION OF THE DRAWINGS

Other features and advantages of the present invention will become apparent from the following description of one exemplary embodiment with reference to the accompanying drawings.

DETAILED DESCRIPTION

Figure 1:
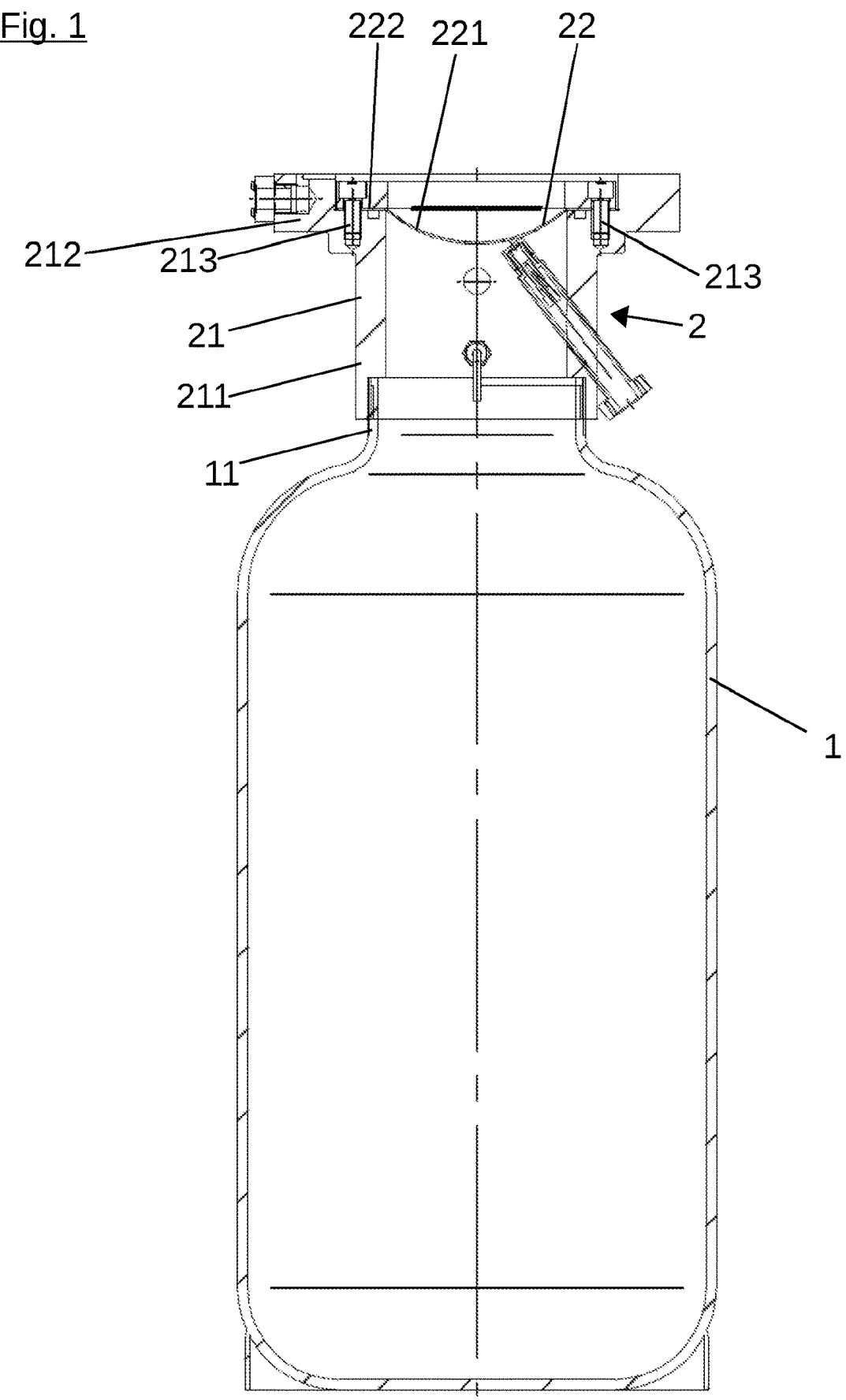
FIG. 1 is a cross section of a container secured with a rupture disk assembly according to the invention.
Figure 2:
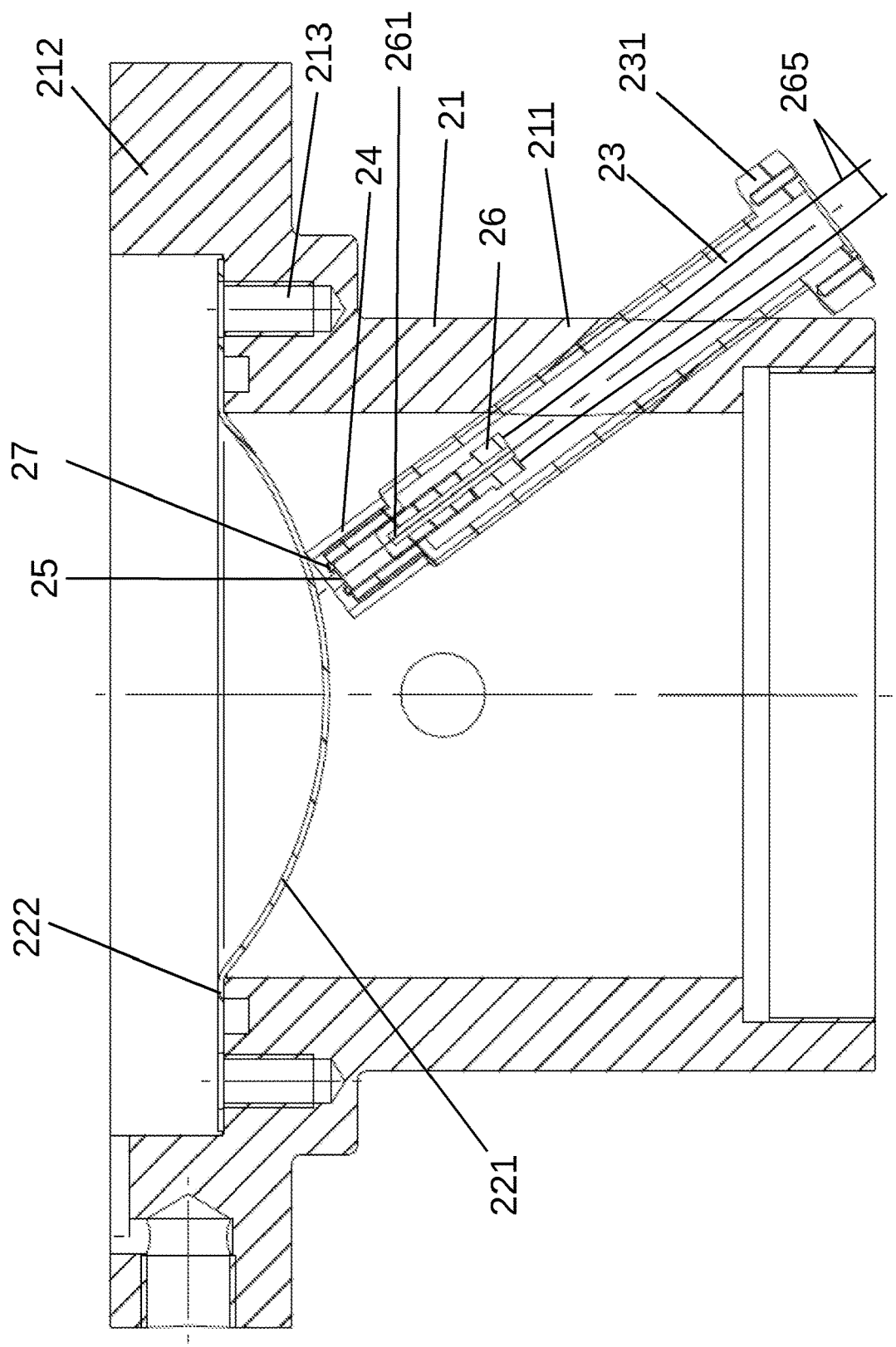
FIG. 2 is a cross section of the rupture disk assembly.
Figure 3:
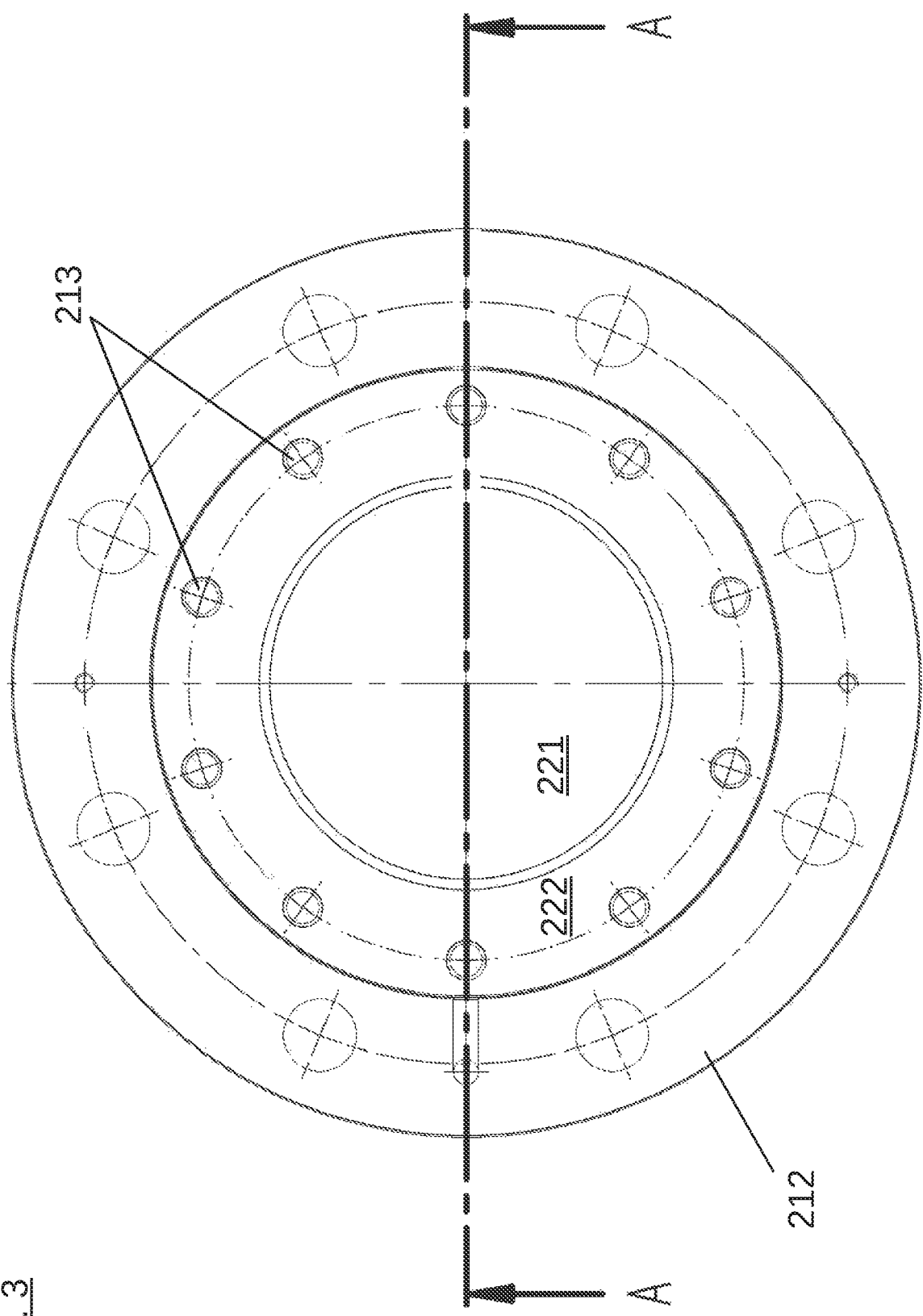
FIG. 3 is a plan view of the rupture disk assembly.
Figure 4:
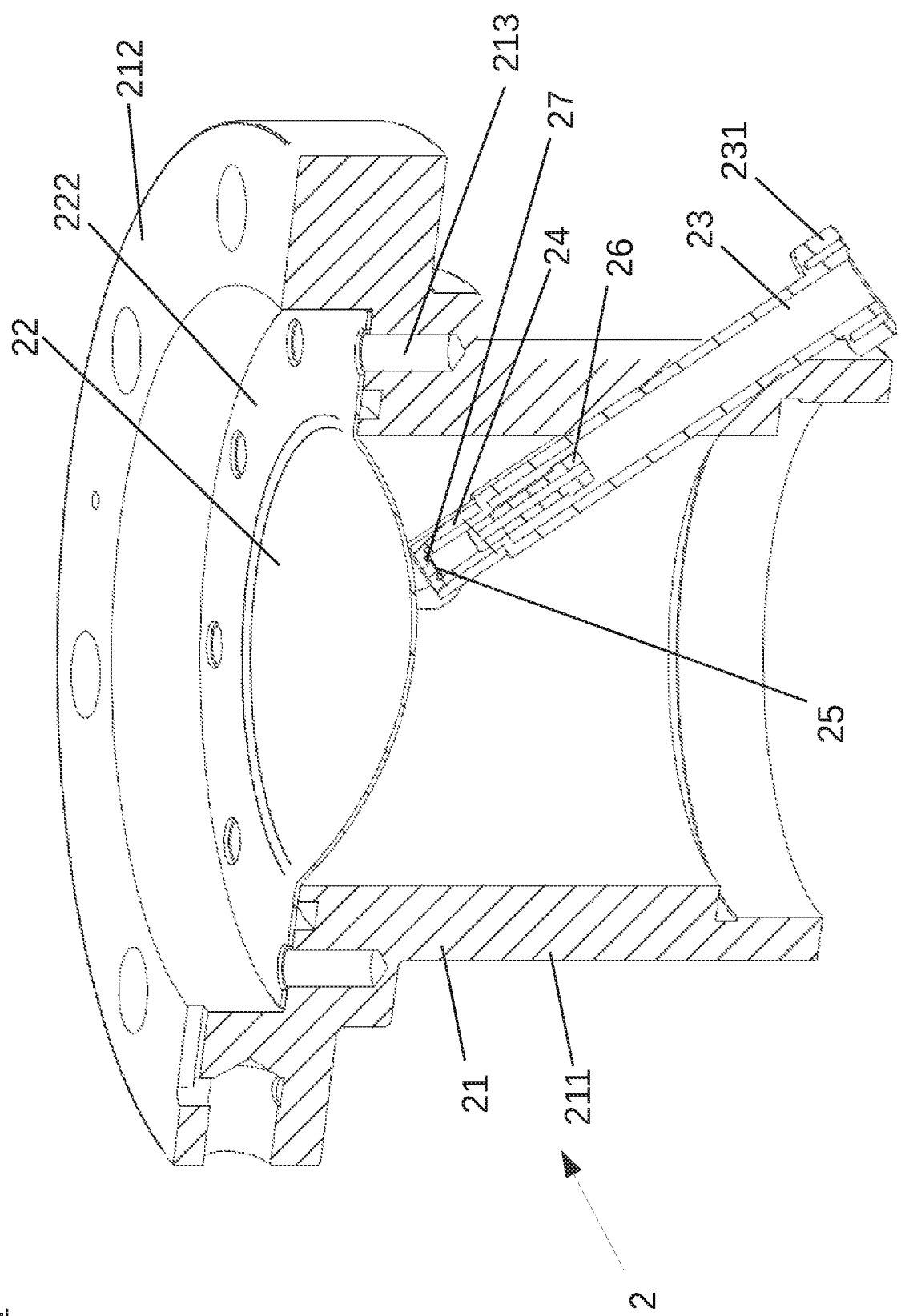
FIG. 4 is a perspective view of the cut rupture disk assembly.

The container 1, secured by the rupture disk assembly of the present invention, is a gas cylinder. The gas cylinder is constructed in the conventional way and comprises a short and wide bottle neck 11 on the upper end. The bottle neck 11 has an outside thread.

The rupture disk assembly 2 is mounted on the bottle neck 11. The rupture disk assembly 2 comprises a body 21 with a hollow cylindrical section 211 and a bulging section 212, which forms a flange. The flange is provided on a first (in the embodiment) upper end of the body 21. The end, which is located opposite the first end and is part of the body 21, is provided with an inside thread, with which the body 21 is screwed permanently to the bottle neck 11.

A shoulder is provided on the flange 212. The result of this shoulder is an inner, retracted ring-shaped face. The threaded bores 213 begin in this face.

The rupture disk assembly 2 comprises a rupture disk 22. The circular rupture disk 22 is a reversible rupture disk. That means that it is curved in the direction of the inner space of the gas cylinder, which is pressurized during operation. The circular rupture disk has an outside diameter, which corresponds to the outside diameter of the inner ring of the flange 212. The rupture disk 22, which is produced from a sheet metal blank, has, in addition to an inner region 221, which is curved in the direction of the inner space of the gas cylinder, an annular region 222, which lies on the inner ring of the flange 212. In this case circular holes in the annular region 222 of the rupture disk 22 are located above the threaded bores 213; and the rupture disk is connected, optionally subject to the concomitant action of other components, which are not shown in greater detail, to the body 21 with screws, which are not shown.

A first threaded bore, which passes at an angle through the wall of the section 211 and is aligned with the rupture disk 22, is provided in the hollow cylindrical section 211 of the body. A housing 23 is disposed in this first threaded bore. The housing 23 resembles a screw, which has an axial passage hole that extends from a screw head 231, provided with an outer hexagon, up to the tip of the screw. The housing 23 is screwed into the first threaded bore in the body 21.

The tip of the screw-like housing 23 is provided with a screw cap 24. The screw cap 24 is screwed on the tip of the housing 23. The screw cap 24 holds a cover 25 pressed against the tip of the housing 23 and, in so doing, closes the tip of the housing 23. The cover 25 is a sheet metal blank. In order to improve the sealing, a seal 27 is provided between the cover 25 and the housing 23.

The cover 25 closes the inner space of the housing 23 with respect to the inner space of the body 21 and the gas cylinder 1.

An actuator 26 is provided in the housing 23. The actuator 26 has a plunger 261 and a drive, which is not shown. The actuator is connected to a controller, which is also not shown, by cables 265.

The drive of the actuator 26 may drive the plunger 261 against the cover 25, so that the cover 25 is destroyed; and the plunger 261 is then impelled against the rupture disk 22. In this way the structure of the rupture disk 22 is changed, as a result of which the rupture pressure is lowered.

What is claimed is:

1. A rupture disk assembly, comprising:
    a single-part or multi-part body with an opening that forms an outlet for a conduit or a container, the body including a main bore extending from an inlet to the outlet and a threaded bore that intersects the main bore;
    a rupture disk that closes the opening and bursts subject to action of a rupture pressure in order to unblock the opening;
    an actuator located on a pressure side of the rupture disk to reduce the rupture pressure, wherein the actuator includes a plunger to reduce the rupture pressure on the rupture disk, the plunger being configured to strike against the rupture disk;
    a housing to receive the actuator and being screwable into the threaded bore of the body and projecting into an inner space defined by the main bore, the housing including a housing opening for the plunger; and
    a cover to close the housing opening, wherein the cover and the actuator are adapted to one another such that, upon actuation of the actuator, a force acting on the plunger of the actuator is sufficient to pierce the cover and to strike against the rupture disk.

2. The rupture disk assembly of claim 1, wherein the cover is a circular blank.

3. The rupture disk assembly of claim 1, wherein the cover consists of plastic or metal.

4. The rupture disk assembly of claim 1, further comprising:
a screw cap or perforated cap to mount the cover on the housing, wherein an opening of the screw cap or perforated cap is sufficiently large to permit the plunger of the actuator to pass through.

5. The rupture disk assembly of claim 4, further comprising at least one seal to seal the cover with respect to the housing, the screw cap, or the perforated cap.

6. The rupture disk assembly of claim 1, wherein an end of the housing, provided with the cover, projects into the inner space defined by the main bore.

7. The rupture disk assembly of claim 1, wherein an end of the housing projects beyond the body and comprises an opening through which cables are run from or to the actuator.

8. The rupture disk assembly of claim 1, wherein the body includes a flange on which the rupture disk is mounted.

9. The rupture disk assembly of claim 8, wherein the body includes a hollow cylindrical section that defines the main bore, and the threaded bore is provided in the hollow cylindrical section.

10. The rupture disk assembly of claim 9, wherein the hollow cylindrical section of the body is connected to the flange of the body on a first side and is closed by the rupture disk adjacent to the flange.

11. The rupture disk assembly of claim 10, wherein a second side of the hollow cylindrical section of the body comprises connecting structures for connecting to the container.

12. The rupture disk assembly of claim 1, wherein the housing has a section with an inside thread, the actuator has a section with an outside thread, and the actuator is screwable into the inside thread of the housing.

13. The rupture disk assembly of claim 1,
wherein the actuator is not in contact with pressurized medium to reduce the rupture pressure.

14. A rupture disk assembly, comprising:
a single-part or multi-part body with an opening that forms an outlet for a conduit or a container;
a rupture disk that closes the opening and bursts subject to action of a rupture pressure in order to unblock the opening;
an actuator located on a pressure side of the rupture disk and not in contact with pressurized medium to reduce the rupture pressure prior to an actuation, wherein the actuator includes a plunger to reduce the rupture pressure on the rupture disk, the plunger being configured to strike against the rupture disk;
a housing to receive the actuator, the housing including a housing opening for the plunger,
wherein the body includes a first side of a hollow cylindrical section that defines a main bore extending from an inlet to the outlet, the hollow cylindrical section being connected to a flange of the body on the first side and closed by the rupture disk adjacent to the flange and the hollow cylindrical section including a threaded bore into which the housing is inserted, the threaded bore intersecting the main bore, and
wherein a second side of the hollow cylindrical section of the body comprises connecting structures for connecting to the container;
a cover to close the housing opening, wherein the cover and the actuator are adapted to one another such that, upon an actuation of the actuator, a force acting on the plunger of the actuator is sufficient to pierce the cover and to strike against the rupture disk; and
a screw cap to mount the cover on the housing.

15. The rupture disk assembly of claim 14, wherein an opening of the screw cap or perforated cap is sufficiently large to permit the plunger of the actuator to pass through.

16. The rupture disk assembly of claim 15, further comprising at least one seal to seal the cover with respect to the housing or the screw cap.

17. The rupture disk assembly of claim 14, wherein the threaded bore includes an inside thread, and the housing is screwable into the threaded bore by an outside thread.

18. The rupture disk assembly of claim 14, wherein the housing projects into an inner space defined by the main bore.

19. The rupture disk assembly of claim 14, wherein an end of the housing, provided with the cover, projects into an inner space defined by the main bore.

* * * * *